March 15, 1966 P. H. LINKMEYER 3,241,112
TIRE PRESSURE WARNING DEVICE
Filed Oct. 11, 1963
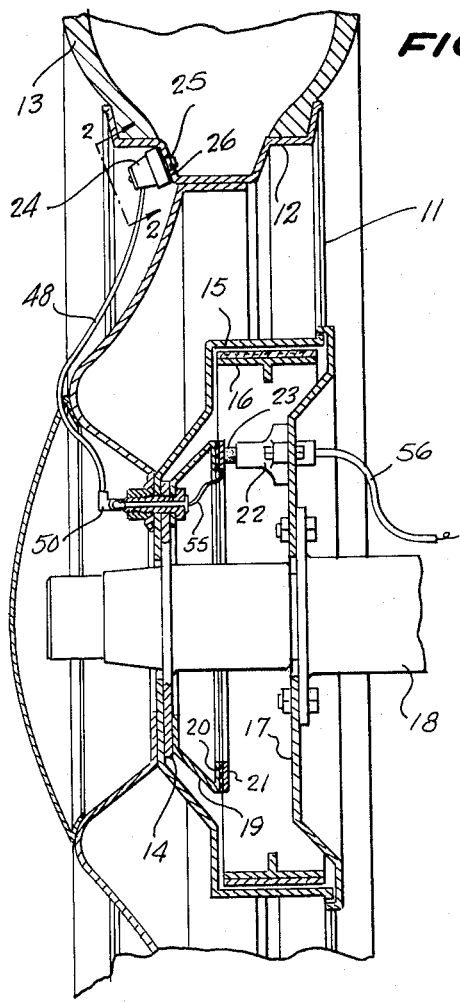
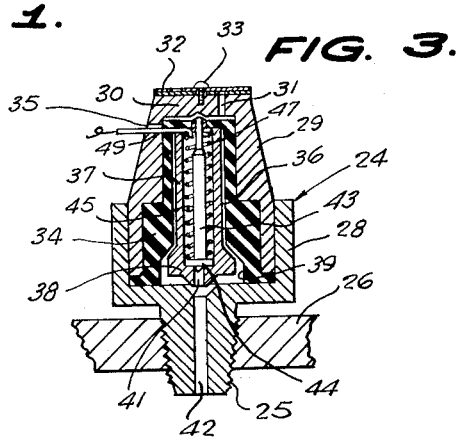
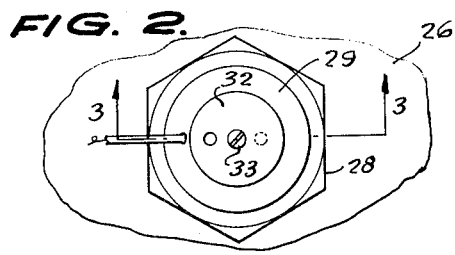
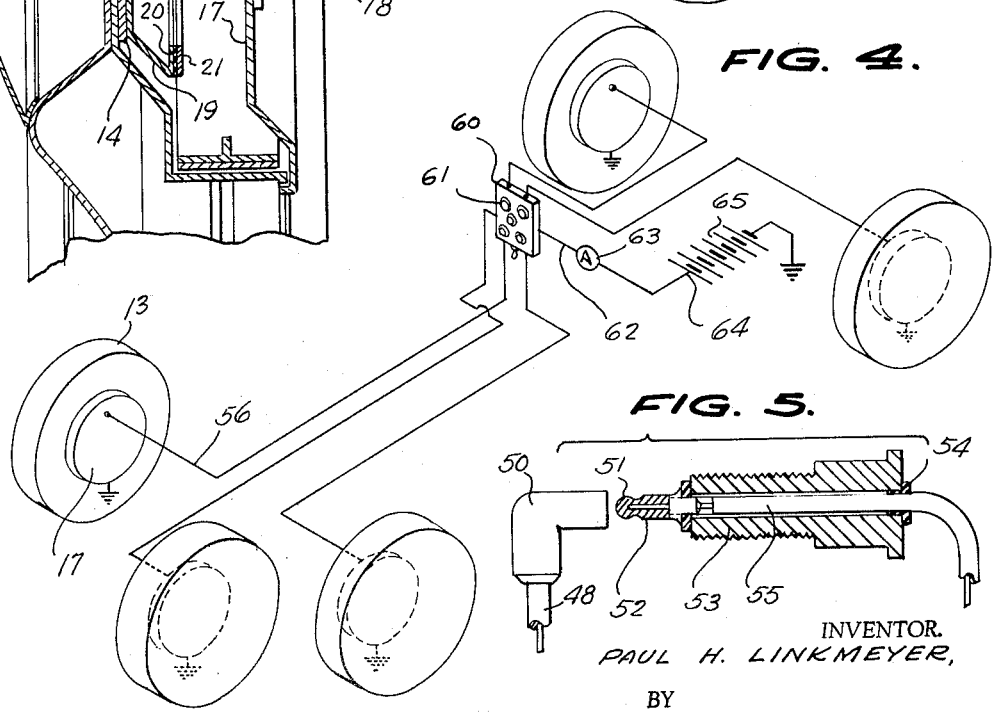
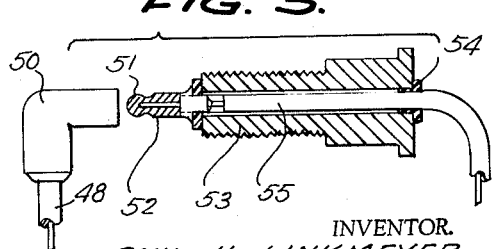
INVENTOR.
PAUL H. LINKMEYER,
BY
McMorrow, Berman + Davidson
ATTORNEYS.

United States Patent Office 3,241,112
Patented Mar. 15, 1966

3,241,112
TIRE PRESSURE WARNING DEVICE
Paul H. Linkmeyer, Rte. 5, Angola, Ind.
Filed Oct. 11, 1963, Ser. No. 315,624
4 Claims. (Cl. 340—58)

This invention relates to safety devices for motor vehicles, and more particularly to a tire pressure indicating system for motor vehicle wheels.

A main object of the invention is to provide a novel and improved system for indicating the tire pressure of the various wheels of a motor vehicle and for showing the presence of either excessive pressure in the tire or an unsafe deflated condition thereof, while at the same time allowing over-inflation to be relieved, the system involving relatively simple components, being easy to install, and providing exact information as to the location of a tire having incorrect pressure therein.

A further object of the invention is to provide an improved tire pressure indicating system especially adapted for motor vehicles using tubeless tires, the system involving relatively inexpensive components, requiring a minimum amount of modification of a motor vehicle in order to install same, and providing a distinctive flashing light signal to indicate over-inflation of any one of the tires of the motor vehicle while also providing a steady light signal to show that a tire has an unsafe under-inflated condition.

Further objects and advantages of the invention will become apparent from the following description and claims, and from the accompanying drawings, wherein:

FIGURE 1 is a fragmentary vertical cross sectional view taken through a typical motor vehicle wheel equipped with tire pressure-detecting means forming part of a tire pressure indicating system in accordance with the present invention.

FIGURE 2 is an enlarged fragmentary elevational view taken substantially on the line 2—2 of FIGURE 1.

FIGURE 3 is a cross sectional view taken substantially on the line 3—3 of FIGURE 2.

FIGURE 4 is a schematic wiring diagram showing the electrical connections of a typical tire pressure indicating system according to the present invention employing components such as those illustrated in FIGURES 1, 2 and 3.

FIGURE 5 is an enlarged fragmentary cross sectional detail view of the electrical stud connector of FIGURE 1, showing a hollow wheel-mounting stud element, employed as an electrical connection member and a cooperating female connection element associated therewith, as employed in the arrangement illustrated in FIGURE 1, the female element being shown separated from the male contact element.

Referring to the drawings, 11 indicates a conventional motor vehicle wheel of the type provided with an annular rim 12 on which is mounted a pneumatic tire 13 of the tubeless type. The wheel 11 is mounted in a substantially conventional manner on an axle hub 14 to which is secured a brake drum 15 which surrounds a brake shoe assembly 16 carried on a fixed back plate 17, which in turn is secured to the fixed axle housing member 18.

In accordance with the present invention, a generally frusto-conical annular supporting ring 19 is secured inside the hub assembly, for example, to the rear surface of the hub plate 14, shown in FIGURE 1, the annular supporting ring 19 being provided with an interned inside rim flange 20. Designated at 21 is an annular contact ring which is mounted on but insulated from the rim flange 20 and which is thus arranged concentrically with the wheel 11. Mounted on the back plate 17 is an insulated brush housing 22 which carries a fixed contact brush 23, the housing 22 being located at the same radial distance from the axis of the wheel as the ring 21 so that the brush 23 conductively and slidably engages the annular contact ring 21 at all times.

Designated generally at 24 is a switch member which is mounted on the inner portion of the rim 12, the switch member having an externally threaded conduit element 25 which is threadably engaged through an inclined wall 26 of the rim 12 and which is located so as to be in communication with the interior of the tubeless tire 13.

As shown in FIGURE 3, the switch device 24 comprises the metal main bushing element 28 integrally formed with the externally threaded axially extending conduit element 25, and rigidly secured in the bushing element 28 is a metal cup member 29, defining with the bushing 28 a substantially closed housing. The end wall 30 of the cup member 29 opposite the conduit element 25 is formed with a vent aperture 31 which is normally closed by a flexible dust cover disc 32 centrally secured to the end wall 30 by a fastening screw 33, the cover 32 being sufficiently flexible to allow air under pressure to force its way outwardly from the vent 31.

Secured in the chamber thus defined by the members 28 and 29 is an insulating lining 34 which has a centrally apertured inner end wall 35 spaced slightly from the end wall 30 of cup member 29 to define air clearance space providing communication between the vent aperture 31 and the interior of the insulating lining 34.

Slidably mounted in the axial bore 36 of the lining 34 is a metal sleeve-like conductive plunger contact 37 having an enlarged head portion 38 received in an enlarged end cavity portion 39 of the bore of the lining member 34. The head portion 38 has a central aperture 41 facing the bore 42 of conduit element 25, and slidably and conductively mounted within the inner bore of the sleeve-like member 37 is a metal venting piston 43 having an enlarged head 44 sealingly engageable on the inside wall of the element 38 and urged thereagainst by a coiled spring 45 which surrounds the shank portion of the piston 43 and bears between the head 44 and the top wall 35 of the lining member 34, as shown in FIGURE 3. The spring 45 likewise biases the plunger contact member 37 downwardly, as viewed in FIGURE 3, and urges the enlarged head member 38 thereof into sealing contact with the bottom wall of the bushing member 28. However, if the air pressure in the tire 13 is at its rated value, namely, is above a predetermined safe low value, the force on the member 38 will be sufficient to overcome the biasing force of the spring 45 and will hold the plunger contact 37 in a position separated from the bottom wall of the bushing member 28, as shown in FIGURE 3.

The piston 43 is provided on its top end, as viewed in FIGURE 3, with a contact tip portion 47 which extends through the central aperture provided in the lining end wall 35 and which is normally spaced from the end wall 30 of the cup member 29 but which is movable into contact therewith against the biasing force of the spring 45 when the air pressure in the tire 13 is a substantial amount above the above mentioned predetermined safe low value, namely, when the tire 13 is considerably over-inflated. Thus, when there is excessive air pressure in the tire 13, the head 44 of the piston 43 is lifted off its seat and the piston 43 is moved into contact with wall 30 in an intermittent manner, since the pressure will relieve itself intermittently by escaping through the inside bore of the member 37, the top aperture of the wall 35, the space between wall 35 and wall 30, the aperture 31, and the space between the flexed portion of the cover 32 and the wall 30. The compressed air will intermittently escape through the relief passage above defined, namely, will escape in short pulses, causing the piston 43 to reciprocate as the head portion 44 thereof alternately unseats and reseats on the member 38, causing the contact tip 47 to intermittently come into contact with the end wall 30 of cup member 29. This reciprocation of the piston 43 will continue until the pressure of the air in the tire 13 has decreased to its rated value, after which there will be insufficient pressure to move the piston head 44 away from its seat over the aperture 41.

Designated at 48 is a flexible insulated conductor, one end of which extends through an aperture 49 in the cup member 29 and through the lining member 34, the conductor of the wire 48 being connected to the coiled spring 45. Thus, the wire 48 is grounded to the vehicle frame either when head 38 comes into contact with the bottom wall of bushing member 28, as viewed in FIGURE 3, as a result of under-inflation of the tire 13, or when the contact tip 47 engages the top wall 30 of the cup member 29 as a result of over-inflation of said tire, in the manner above described. The insulated wire 48 is provided at its end opposite the switch device 24 with an insulated female connection terminal 50 which is cooperatively engageable with a male contact tip 51 carried on a contact pin 52 extending into a hollow stud 53 and being insulated therefrom by an insulating sleeve 54, as shown in FIGURE 5. The hollow stud 53 is located on the hub plate 14 in the same position as a conventional wheel-fastening stud, thereby replacing said conventional wheel-fastening stud, and allowing the wheel to be mounted on the hub plate 14 in the usual manner. The pin 52 is electrically connected to the conductor of an insulated wire 55 extending through the hollow stud 53, as shown in FIGURE 5. As will be readily apparent, when the wheel is to be dismounted from the hub plate 14, the female connector 50 may be detached from the male tip element 51, so that the wire 48 will not interfere with the dismounting of the wheel or with the replacement thereof.

As shown in FIGURE 1, the wire 55 is connected to the annular contact ring 21.

An insulated wire 56 is connected through the brush holder 22 to the brush member 23, so that under normal conditions wire 56 is electrically connected to wire 48, and the wire 56 will become grounded to the vehicle frame either when head member 38 moves into engagement with the bottom wall of bushing 28 as a result of under-inflation of the tire or the contact tip 47 engages top wall 30 of cup member 29 as a result of over-inflation.

Mounted in the operator's compartment of the vehicle, for example, on the vehicle dashboard, is an indicating panel 60 containing respective indicating lamp units 61, one for each of the vehicle wheels, including the vehicle spare wheel, each lamp unit 61 having a lamp contained in a socket one of whose terminals is connected by suitable wiring on the panel 60 to the ungrounded battery terminal conductor 62, which is in turn connected through the ammeter 63 to the ungrounded terminal 64 of the vehicle battery 65. The remaining terminal of each lamp socket is connected to a respective wire 56, so that when a wire 56 becomes grounded by the action of the associated switch 24, as above described, the associated lamp on panel 60 becomes energized.

As will be readily understood, when any of the tires 13 is over-inflated, causing the piston element 43 of its associated switch assembly 24 to reciprocate in the manner above described, the corresponding lamp unit 61 on the panel 60 will become intermittently energized and will blink in a characteristic manner, indicating the over-inflated condition of the associated tire. Since each lamp assembly 61 has a location corresponding to a given vehicle tire, the location of the over-inflated tire is readily apparent.

As above mentioned, the blinking action will continue as long as the over-inflated condition exists, but eventually, the excess air will be vented from the tire, whereupon the blinking action will terminate. However, the blinking of the lamp 61 will indicate to the vehicle operator that one of the tires is overinflated, so that if he so desires he can take the necessary measures to reduce the pressure in the tire manually.

In the same manner, should one of the tires 13 become under-inflated, the associated lamp on the panel 60 will become steadily energized, since the head element 38 of the associated switch unit 24 will be moved by its biasing spring 45 into contact with the grounded bottom wall portion of the associated bushing member 28, energizing the lamp. As in the case of over-inflation, the location of the under-inflated tire will be immediately seen, since the corresponding lamp on panel 60 will then be steadily energized.

The limits of operation of the switch device 24 may be regulated by the selection of a suitable biasing spring 45. For example, the biasing spring 45 may be of suitable strength so that the head portion 44 of piston 43 will not be lifted off its seat until the pressure in the associated tire 13 is ten pounds per square inch above the pressure recommended by the tire manufacturer. By suitably dimensioning the head portion 38 of the contact plunger 37, the force exerted by the air in the tire may be made sufficient to hold head portion 38 out of contact with the bottom wall of bushing member 28 until the pressure in the tire drops to a value approximately five pounds per square inch below that recommended by the tire manufacturer.

While a specific embodiment of an improved tire pressure indicating system for the wheels of a motor vehicle has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A tire pressure indicating device for a vehicle wheel having an inflated tire and having a brake drum located adjacent the fixed back plate therefor, including an annular contact mounted concentrically in the drum, a stationary contact carried by said back plate and conductively and slidably engaging said annular contact, a signal device, a source of current, a pressure-responsive intermittently opening relief valve on the wheel communicatively connected with the interior of the tire, switch means operated by said relief valve, means connecting said switch means, signal device, annular contact, stationary contact and source of current in a series circuit, means to close said switch means when the tire pressure decreases below a predetermined value, and means to intermittently close said switch means concurrently with the intermittent operation of said valve when the pressure in the tire is substantially above said predetermined value.

2. A tire pressure indicating device for a vehicle wheel having an inflated tire and having a brake drum located adjacent a fixed back plate therefor, including an annular contact mounted concentrically in the drum, a stationary contact carried by said back plate and conductively and slidably engaging said annular contact, a signal device, a source of current, a pressure-responsive switch on the wheel, said switch comprising a conductive chamber mounted on the wheel and communicating with the interior of the tire, a movable hollow plunger contact in said chamber biased toward a wall of said chamber, means to hold said plunger contact away from said wall when the tire pressure is above a predetermined value, a conductive venting piston slidably mounted in said plunger contact and exposed to the tire pressure, means to move said venting piston intermittently to open position and into intermittent conductive contact with said chamber when the tire pressure is substantially above said predetermined value, and means connecting said plunger contact, chamber, annular contact, stationary contact, signal device, and source of current in a series circuit, whereby to energize said signal device steadily when the tire pressure is below said predetermined value and intermittently when the tire pressure is substantially above said predetermined value.

3. A tire pressure indicating device for a vehicle wheel having an inflated tire and having a brake drum located adjacent a fixed back plate therefor, including an annular contact mounted concentrically in the drum, a stationary contact carried by said back plate and conductively and slidably engaging said annular contact, a signal device, a source of current, a pressure-responsive switch on the wheel, said switch comprising a conductive chamber mounted on the wheel and communicatively connected at one end with the interior of the tire, said chamber having a vent at its other end, a hollow conductive plunger contact movably mounted in said chamber facing said one end, spring means biasing said plunger contact toward said one end and causing said plunger contact to engage said one end unless the tire pressure is above a predetermined value, a conductive venting piston slidably mounted in said plunger contact and exposed to the tire pressure, means to move said venting piston into intermittent conductive contact with the chamber when the tire pressure is substantially above said predetermined value, and means connecting said plunger contact, chamber, annular contact, stationary contact, signal device and source of current in a series circuit, whereby to energize said signal device steadily when the tire pressure is below said predetermined value and intermittently when the tire pressure is substantially above said predetermined value.

4. A tire pressure indicating device for a vehicle wheel having an inflated tire and having a brake drum located adjacent a fixed back plate therefor, including an annular contact mounted concentrically in the drum, a stationary contact carried by said back plate and conductively and slidably engaging said annular contact, a signal device, a source of current, a pressure-responsive switch on the wheel, said switch comprising a conductive chamber mounted on the wheel and communicatively connected at one end with the interior of the tire, said chamber having a vent at its other end, a sleeve-like movable conductive plunger contact mounted in said chamber and having a centrally apertured head portion facing said one end, a conductive venting piston slidably mounted in said plunger contact, spring means acting between the piston and said other end of the chamber and urging the piston into sealing contact with the apertured head portion and urging said head portion toward conductive engagement with said one end, said head portion being held out of contact with said one end when the tire pressure is above a predetermined value, said piston being intermittently moved out of sealing contact with said head portion and into intermittent conductive engagement with said other end of the chamber when the tire pressure is a substantial amount above said predetermined value, and means connecting said plunger contact, chamber, annular contact, stationary contact, signal device, and source of current in a series circuit, whereby to energize said signal device steadily when said tire pressure is below said predetermined value and intermittently when the tire pressure is substantially above said predetermined value.

References Cited by the Examiner

UNITED STATES PATENTS 22,179,255   11/1939   Edmonston _____ 340—58

NEIL C. READ, *Primary Examiner.*

A. H. WARING, *Assistant Examiner.*